United States Patent
Schöller et al.

(10) Patent No.: US 12,065,526 B2
(45) Date of Patent: Aug. 20, 2024

(54) PROCESS FOR THE PREPARATION OF POLYALKYL (METH)ACRYLATE POLYMERS

(71) Applicant: Evonik Operations GmbH, Essen (DE)

(72) Inventors: Katrin Schöller, Bad Soden (DE); Sarah Lippert, Darmstadt (DE); Wolfgang Tschepat, Darmstadt (DE); Fabian Ziegler, Darmstadt (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/997,231

(22) PCT Filed: Apr. 28, 2021

(86) PCT No.: PCT/EP2021/061055
§ 371 (c)(1),
(2) Date: Oct. 26, 2022

(87) PCT Pub. No.: WO2021/219686
PCT Pub. Date: Nov. 4, 2021

(65) Prior Publication Data
US 2023/0174695 A1  Jun. 8, 2023

(30) Foreign Application Priority Data

Apr. 30, 2020 (EP) .................... 20172360

(51) Int. Cl.
| | | |
|---|---|---|
| *C08F 220/18* | (2006.01) | |
| *C10M 145/14* | (2006.01) | |
| *C10N 20/02* | (2006.01) | |
| *C10N 20/04* | (2006.01) | |
| *C10N 30/00* | (2006.01) | |

(52) U.S. Cl.
CPC ......... *C08F 220/18* (2013.01); *C10M 145/14* (2013.01); *C10M 2203/1025* (2013.01); *C10M 2209/084* (2013.01); *C10N 2020/02* (2013.01); *C10N 2020/04* (2013.01); *C10N 2030/68* (2020.05)

(58) Field of Classification Search
CPC ........ C08F 220/18; C08F 2/44; C08F 279/02; C10M 145/14; C10M 2203/1025; C10M 2209/084; C10M 2205/04; C10M 2209/04; C10N 2020/02; C10N 2020/04; C10N 2030/68; C10N 2030/02
See application file for complete search history.

(56) References Cited

U.S. PATENT DOCUMENTS

| | | | |
|---|---|---|---|
| 6,599,864 B1 | 7/2003 | Bertomeu | |
| 10,633,610 B2* | 4/2020 | Schöller | ............... C08F 290/128 |
| 10,731,097 B2* | 8/2020 | Schöller | ............... C08F 290/048 |
| 2008/0194443 A1 | 8/2008 | Stohr et al. | |
| 2010/0190671 A1 | 7/2010 | Stoehr et al. | |
| 2011/0306533 A1 | 12/2011 | Eisenberg et al. | |
| 2011/0319305 A1 | 12/2011 | Eisenberg et al. | |
| 2016/0097017 A1 | 4/2016 | Eisenberg et al. | |
| 2019/0177641 A1 | 6/2019 | Klein et al. | |

FOREIGN PATENT DOCUMENTS

| | | |
|---|---|---|
| CN | 109912756 | 6/2019 |
| CN | 110914393 | 3/2020 |
| EP | 0 776 959 | 6/1997 |
| EP | 0 668 342 | 8/1999 |
| EP | 1 029 029 | 8/2000 |
| EP | 3 450 527 | 3/2019 |
| GB | 2270317 | 3/1994 |
| WO | 97/21788 | 6/1997 |
| WO | 99/20720 | 4/1999 |
| WO | 99/41332 | 8/1999 |
| WO | 00/08115 | 2/2000 |
| WO | 00/14179 | 3/2000 |
| WO | 00/14183 | 3/2000 |
| WO | 00/14187 | 3/2000 |
| WO | 00/14188 | 3/2000 |
| WO | 00/15736 | 3/2000 |
| WO | 01/18156 | 3/2001 |
| WO | 01/57166 | 8/2001 |
| WO | 2013/189951 | 12/2013 |
| WO | 2014/170169 | 10/2014 |
| WO | 2018/041755 | 3/2018 |
| WO | 2018/114673 | 6/2018 |
| WO | 2019/012031 | 1/2019 |

OTHER PUBLICATIONS

International Search Report dated Jul. 13, 2021, in PCT/EP2021/061055, 4 pages.
Written Opinion dated Jul. 13, 2021, in PCT/EP2021/061055, 7 pages.

* cited by examiner

*Primary Examiner* — Cephia D Toomer
(74) *Attorney, Agent, or Firm* — Grüneberg and Myers PLLC

(57) ABSTRACT

A novel process can be used for the preparation of polyalkyl (meth)acrylate polymers with improved compositional distribution, which leads to better producibility, solubility, and improved performance of the polymers in lubricant compositions, especially in engine oil formulations.

17 Claims, No Drawings

PROCESS FOR THE PREPARATION OF POLYALKYL (METH)ACRYLATE POLYMERS

CROSS-REFERENCE TO RELATED APPLICATIONS

This application is the National Stage entry under § 371 of International Application No. PCT/EP2021/061055, filed on Apr. 28, 2021, and which claims the benefit of priority to European Application No. 20172360.8, filed on Apr. 30, 2020. The content of each of these applications is hereby incorporated by reference in its entirety.

BACKGROUND OF THE INVENTION

Field of the Invention

The present invention is directed to a novel process for the preparation of polyalkyl (meth)acrylate polymers with improved compositional distribution leading to better producibility, solubility and improved performance of the products in lubricant compositions, especially in engine oil formulations.

Description of Related Art

Lubricants are playing an important role in reducing a vehicle's fuel consumption and there is a continuing need for improvements in fuel economy performance.

Formulations of motor oils are generally defined by the SAE J300 standard (SAE=Society of Automotive Engineers). This standard classifies motor oils into the SAE viscosity grades xW-y where x=0, 5, 10, 15, 20, 35 and y=8, 12, 16, 20, 30, 40, 50, 60. This is done e.g. via the kinematic viscosity KV (ASTM D445) and the high-temperature high-shear viscosity HTHS (ASTM D4683, D4741 and D5471), which parameters are important for engine protection.

Lubricant properties are typically improved by the addition of additives to lubricating oils. Viscosity index (VI) improvers are generally added to a lubricant to improve its thickening efficiency and to protect the engine.

In the past decade, a lot of efforts were taken to improve lubricants towards better fuel efficiency.

Polyalkyl (meth)acrylate-based polymers, and especially polyalkyl (meth)acrylates comprising macromonomers, are commonly used as additives, especially as viscosity index improvers. They show good viscometric properties like low $KV_{40}$, $HTHS_{80}$ and $HTHS_{100}$ values in engine oil formulations leading to good fuel economy.

Polyalkyl (meth)acrylate polymers usually comprise short-chain alkyl (meth)acrylates and long-chain alkyl (meth)acrylates. Short-chain alkyl (meth)acrylates are more polar and contribute to the viscometric properties of the resulting polymer, whereas long-chain alkyl (meth)acrylates are less polar and provide the oil solubility of the resulting polymer.

The composition of a polyalkyl (meth)acrylate has to be well balanced between polar and apolar monomers as a raise in polarity usually comes along with poor solubility and an undesired change in the viscometric performance of the polymer.

Adding a high number of polar monomers like methyl (meth)acrylate (MMA), butyl (meth)acrylate (BMA) or styrene to polyalkyl (meth)acrylates and specifically to polyalkyl (meth)acrylates comprising macromonomers leads to the technical problem that the polarity of the polymer is increased too much leading to a changed viscosity and in general a poorer solubility of the polymer in oil.

One typical approach to counteract this polarity increase is to balance the polymer polarity by increasing the amount of less polar comonomers like for example long-chain alkyl (meth)acrylates or macromonomers. Although the solubility of the polymer in oil can be improved this way, the drawback of this approach is that the viscometric performance measured as $KV_{40}$, $HTHS_{80}$, or $HTHS_{100}$ values in oil is compromised. This means that increasing for example the amount of long-chain alkyl (meth)acrylates leads to an increased $KV_{40}$, $HTHS_{80}$ and $HTHS_{100}$ and therefore reduced fuel efficiency effect.

The comb polymer technology in general and their use as viscosity index improvers is already known (US 2008/0194443 and US 2010/0190671).

The viscometric performance of a polyalkyl (meth)acylate based comb polymer can e.g. be improved by introducing novel monomers. It is already known in the art that a certain amount of macromonomers has a positive impact on fuel efficiency (US 2010/0190671), that the presence of alkyl acrylates improves the NOACK volatility (WO 2018/041755) and a certain amount of imide functionality has a positive impact on friction reduction (WO 2019/012031).

Another challenge that usually comes along with a reduced solubility and the polymer becoming too polar is that the polymer's producibility and especially up-scalability in the plant might be hindered. Possible results are, for example, an immense increase in haziness in the product, increased in-process viscosities, increased heat-generation and/or the building of non-soluble deposits. Each of these drawbacks can hinder the production of such a product or do at least lead to an economically not favorable production process, where a continuous run is not possible leading to shorter production cycles with extensive and costly cleaning steps of the production kettle after each production batch.

SUMMARY OF THE INVENTION

It was therefore an object of the present invention to provide polyalkyl (meth)acrylates wherein the polarity of the polymer is increased as much as possible to improve or keep good $KV_{40}$, $HTHS_{80}$ and $HTHS_{100}$ performance and, at the same time, provide good solubility, up-scalability and economic producibility.

It was surprisingly found that a novel method for producing polyalkyl (meth)acrylates, wherein the amounts of the different monomers are split into a heel and one or more feeds with different compositions and concentrations, results in polymer compositions that are better balanced, i.e. leads to the formation of a higher amount of polymers having a composition closer to the average polymer composition throughout the whole polymerization process.

This approach leads to products with improved solubility, reduced HAZE (marker for the solubility of the polymer in a given base oil) and reduced deposits formation in the reactor, improved up-scalability and very good viscometric properties at the same time.

The changed process conditions additionally allow the synthesis of new polymer compositions with improved viscometric properties towards fuel efficiency that were not producible before (because of increased in-process viscosities) and showed an unfavorable solubility in oil.

DETAILED DESCRIPTION OF THE INVENTION

The processes known in the art for the preparation of polyalkyl (meth)acrylates are all based on the reaction of a mixture comprising the monomers in the ratios as desired for the resulting polymer(s). These mixtures are either reacted in a one-pot reaction after addition of initiator or they are split into a heel and a feed which do both have exactly the same composition.

US 2008/0194443 and US 2010/0190671 disclose a synthesis of comb polymers wherein a mixture of all monomers is added to an apparatus and diluted with base oil. Subsequently, the reaction mixture is heated to a desired temperature and reacted while several shots of initiator are added after certain time intervals. A split of the monomers into different feeds with different compositions and concentrations of monomers is not mentioned.

US 2011/0306533 and US 2011/0319305 disclose a method for the preparation of comb polymers wherein an initial reaction mixture is prepared comprising all of the monomers and solvent oil. This initial reaction mixture is then split into a heel (about one fifth of the initial reaction mixture) and a feed (about four fifth of the initial reaction mixture). The compositions of the monomers in both, heel and feed are the same as well as are the concentrations of the monomers. After reaching the reaction temperature, several shots of initiator are added after certain time intervals. A split of the monomers into different feeds with different compositions and concentrations of monomers is not mentioned.

WO 2014/170169 discloses a method for the preparation of comb polymers wherein an initial reaction mixture is prepared comprising all the monomers and solvent oil. This initial reaction mixture is then split into a heel (about one third of the initial reaction mixture) and a feed (about two thirds of the initial reaction mixture). The compositions of the monomers in both, heel and feed are the same as well as are the concentrations of the monomers. After reaching the reaction temperature, several shots of initiator are added after certain time intervals. A split of the monomers into different feeds with different compositions and concentrations is not mentioned.

WO 2019/012031 is directed to comb polymers and describes a base polymer synthesis wherein an apparatus is initially charged with a mixture of 300 g of monomers and 200 g of solvent oil. This mixture is heated, and initiator added. Subsequently, another mixture of 300 g of monomers and 200 g of solvent oil, having the same composition and concentration as the initial mixture, is added as a feed as well as further initiator shot. A split of the monomers into different feeds with different compositions and concentrations of monomers is not mentioned.

WO 2018/114673 discloses a method for the preparation of comb polymers wherein an initial reaction mixture of different monomers and solvent oil is prepared. 50% of said mixture are charged into a beaker and the other 50% of the initial mixture fed during a time interval. Monomer composition and concentration are the same. Several shots of initiator are added after certain time intervals. A split of the monomers into different feeds having different compositions and concentrations is not mentioned.

WO 2018/041755 discloses a method for the preparation of comb polymers wherein a heel is charged with an initial mixture of monomers and solvent oil and a feed of monomers in solvent is added. The composition of the monomers in heel and feed are the same, but the concentrations of heel and feed are different.

According to the literature, the monomers generally used to prepare polyalkyl (meth)acrylate polymers do not differ significantly in their Q,e-parameters (Q=reactivity, e=polarity). That means that the person skilled in the art would not expect any difficulties for the copolymerization of different monomers having similar Q,e-parameters. Following the description of the existing polymerization models, only for sterically hindered monomers the kinetics cannot be easily forecasted or calculated.

Copolymerization parameters need to be defined for each comonomer couple individually and temperature, medium and initiator need to be considered as well because the copolymerization parameters are parameters for the relative reactivity only. In systems where the copolymerization parameters of such a monomer A-monomer B couple differ significantly, the first synthesized polymer molecules show a different composition than the later polymerized ones. Partial demixing is therefore a known phenomenon occurring for such polymer mixtures. Copolymers with constant composition overtime can then be obtained by adding the faster polymerizing monomer according to its conversion or working at azeotrope conditions. In technical copolymerizations and products where many comonomers are applied this becomes challenging.

Q,e-parameters allow for an estimation of unknown copolymerization parameters. Similar e-values lead to azeotrope polymers while different e-values lead to alternating copolymers. For some comonomers it is difficult to forecast its copolymerization, especially for sterically hindered monomers or for such that cannot copolymerize.

In systems comprising macromonomers, the kinetics of all monomer couples can become really complicated. It was therefore a surprising finding for the skilled person that simply separating the polar monomers from the apolar (=oil-soluble) monomers was sufficient to get polymers with more uniform distribution and with much better solubility and viscometric performance than those prepared without splitting. This approach is more efficient and easier to implement than checking the reactivity (in oil) plus taking radical concentrations throughout the reaction into account as commonly suggested in the literature.

The described new process can be applied to all free radical polymerizations run in a feed process wherein at least one comonomer exhibits a copolymerization kinetics that varies significantly from the kinetics of the other comonomers.

In principle, all kinds of polyalkyl (meth)acrylates comprising monomers that show differences in polarity, reactivity and oil solubility can be prepared by the process according to the present invention.

A first object of the present invention is therefore directed to a method for the preparation of polyalkyl (meth)acrylate polymers comprising one or more apolar monomers (a) and one or more polar monomers (b), the method comprising the steps of:

(i) preparing a monomer mixture 1 comprising 115 to 125% of the targeted content of monomers (a) and 95% to 100% of the targeted content of monomers (b), the concentration of the monomers in mixture 1 being 30 to 40%;

(ii) adding a monomer mixture 2 comprising 115 to 125% of the targeted content of monomers (a) and 95% to 100% of the targeted content of monomers (b), the concentration of the monomers in mixture 2 being 30 to 40%; and (iii) adding a monomer mixture 3 comprising 110 to 120% of the targeted content of only monomers (b), the concentration of the monomers in mixture 2 being 2 to 6%, characterized in that monomer mixture 1 comprises 38 to 45% of the total amount of monomers used in the process, monomer mixture 2 comprises 38 to 45% of the total amount of monomers used in the process and monomer mixture 3 comprises 15 to 20% of the total amount of monomers used in the process.

As apolar monomers (a) are understood less reactive monomers with good oil solubility that are selected from the group consisting of polyolefin-based macromonomers and other sterically hindered monomers. Preferred polyolefin-based macromonomers are esters of (meth)acrylic acid and hydroxylated hydrogenated polybutadienes.

As polar monomers (b) are understood more reactive monomers with only moderate or even poor oil solubility that are selected from the group consisting of $C_{1-30}$ alkyl (meth)acrylates, substituted and unsubstituted styrenes. Preferred polar monomers are methyl methacrylate, butyl methacrylate, $C_{12-14}$ alkyl methacrylate and styrene.

A further first object is directed to the method as described further above, wherein the polyalkyl (meth)acrylate polymer comprises:
- (a) 8 to 25% by weight of esters of (meth)acrylic acid and hydroxylated hydrogenated polybutadienes;
- (b1) 60% to 80% of $C_{1-4}$ alkyl (meth)acrylates;
- (b2) 10% to 20% by weight of $C_{10-30}$ alkyl (meth)acrylates, preferably $C_{10-15}$ alkyl methacrylates, more preferably $C_{12-14}$ alkyl methacrylates; and
- (b3) 0% to 10% by weight of styrene.

A further first object is directed to the method as described further above, wherein the polyalkyl (meth)acrylate polymer comprises:
- (a) 8 to 15% by weight of esters of (meth)acrylic acid and hydroxylated hydrogenated polybutadienes;
- (b1) 70% to 80% of $C_{1-4}$ alkyl (meth)acrylates;
- (b2) 10% to 20% by weight of $C_{10-30}$ alkyl (meth)acrylates, preferably $C_{10-15}$ alkyl methacrylates, more preferably $C_{12-14}$ alkyl methacrylates; and
- (b3) 0% to 1% by weight of styrene.

A further first object is directed to the method as described further above, wherein the polyalkyl (meth)acrylate polymer comprises:
- (a) 8 to 15% by weight of esters of (meth)acrylic acid and hydroxylated hydrogenated polybutadienes;
- (b1) 70% to 80% of $C_{1-4}$ alkyl methacrylates;
- (b2) 10% to 20% by weight of $C_{10-15}$ alkyl methacrylates, more preferably $C_{12-14}$ alkyl methacrylates; and
- (b3) 0% to 1% by weight of styrene.

The content of each component (a), (b1), (b2) and (b3) is based on the total composition of the polyalkyl (meth)acrylate polymer.

In a particular embodiment, the proportions of components (a), (b1), (b2) and (b3) add up to 100% by weight.

The weight-average molecular weight of the polyalkyl (meth)acrylate polymers according to the present invention is preferably in the range of 100,000 to 1,000,000 g/mol, more preferably in the range of 400,000 to 800,000 g/mol. The number-average molecular weight of the polyalkyl (meth)acrylate polymers according to the present invention is preferably in the range of 30,000 to 300,000 g/mol, more preferably in the range of 60,000 to 200,000 g/mol.

Preferably, the polyalkyl(meth)acrylate polymers according to the present invention have a polydipersity index (PDI) $M_w/M_n$ in the range of 2 to 10, more preferably in the range of 4 to 7. $M_w$ and $M_n$ are determined by size exclusion chromatography (SEC) using commercially available polymethylmethacrylate standards. The determination is affected by gel permeation chromatography with THE as eluent.

A polyalkyl(meth)acrylate polymer in the context of this invention comprises a first polymer, which is also referred to as backbone or main chain, and a multitude of further polymers which are referred to as side chains and are bonded covalently to the backbone. In the present case, the backbone of the polyalkyl(meth)acrylate polymer is formed by the interlinked unsaturated groups of the mentioned (meth)acrylates. The ester groups of the (meth)acrylic esters, the phenyl radicals of the styrene monomers and the substituents of the further free-radically polymerizable comonomers form the side chains of the comb polymer.

The term "(meth)acrylate" refers to both, esters of acrylic acid and esters of methacrylic acid. Methacrylates are preferred over acrylates.

Polyolefin-based macromonomers comprise at least one group which is derived from polyolefins. Polyolefins are known in the technical field and can be obtained by polymerizing alkenes and/or alkadienes which consist of the elements carbon and hydrogen, for example C2-C10-alkenes such as ethylene, propylene, n-butene, isobutene, norbornene, and/or C4-C10-alkadienes such as butadiene, isoprene, norbornadiene. The repeating units derived from polyolefin-based macromonomers comprise preferably at least 70% by weight and more preferably at least 80% by weight and most preferably at least 90% by weight of groups which are derived from alkenes and/or alkadienes, based on the weight of the repeating units derived from polyolefin-based macromonomers. The polyolefinic groups may in particular also be present in hydrogenated form. In addition to the groups which are derived from alkenes and/or alkadienes, the repeating units derived from polyolefin-based macromonomers may comprise further groups. These include small proportions of copolymerizable monomers. These monomers are known per se and include, among other monomers, alkyl (meth)acrylates, styrene monomers, fumarates, maleates, vinyl esters and/or vinyl ethers. The proportion of these groups based on copolymerizable monomers is preferably at most 30% by weight, more preferably at most 15% by weight, based on the weight of the repeat units derived from polyolefin-based macromonomers. In addition, the repeating units derived from polyolefin-based macromonomers may comprise starting groups and/or end groups which serve for functionalization or are caused by the preparation of the repeat units derived from polyolefin-based macromonomers. The proportion of these starting groups and/or end groups is preferably at most 30% by weight, more preferably at most 15% by weight, based on the weight of the repeat units derived from polyolefin-based macromonomers.

Preferred polyolefin-based macromonomers are esters of (meth)acrylic acid and a hydroxylated hydrogenated polybutadiene.

The hydroxylated hydrogenated polybutadiene for use in accordance with the invention has a number-average molar mass $M_n$ of 4,000 to 6,000 g/mol, preferably 4,500 to 5,000 g/mol. Because of their high molar mass, the hydroxylated hydrogenated polybutadienes can also be referred to as macroalcohols in the context of this invention.

The number-average molar mass $M_n$ is determined by size exclusion chromatography using commercially available polybutadiene standards. The determination is affected to DIN 55672-1 by gel permeation chromatography with THE as eluent.

Preferably, the hydroxylated hydrogenated polybutadiene has a hydrogenation level of at least 99%. An alternative measure of the hydrogenation level which can be determined on the copolymer of the invention is the iodine number. The iodine number refers to the number of grams of iodine which can be added onto 100 g of copolymer. Preferably, the copolymer of the invention has an iodine number of not more than 5 g of iodine per 100 g of copolymer. The iodine number is determined by the Wijs method according to DIN 53241-1:1995-05.

Preferred hydroxylated hydrogenated polybutadienes can be obtained according to GB 2270317.

Preference is given to monohydroxylated hydrogenated polybutadienes. More preferably, the hydroxylated hydrogenated polybutadiene is a hydroxyethyl- or hydroxypropyl-terminated hydrogenated polybutadiene. Particular preference is given to hydroxypropyl-terminated polybutadienes.

These monohydroxylated hydrogenated polybutadienes can be prepared by first converting butadiene monomers by anionic polymerization to polybutadiene. Subsequently, by reaction of the polybutadiene monomers with ethylene oxide or propylene oxide, a hydroxy-functionalized polybutadiene can be prepared. This hydroxylated polybutadiene can be hydrogenated in the presence of a suitable transition metal catalyst.

The esters of (meth)acrylic acid for use in accordance with the invention and a hydroxylated hydrogenated polybutadiene described are also referred to as macromonomers in the context of this invention because of their high molar mass.

The macromonomers for use in accordance with the invention can be prepared by transesterification of alkyl (meth)acrylates. Reaction of the alkyl (meth)acrylate with the hydroxylated hydrogenated polybutadiene forms the ester of the invention. Preference is given to using methyl (meth)acrylate or ethyl (meth)acrylate as reactant.

This transesterification is widely known. For example, it is possible for this purpose to use a heterogeneous catalyst system, such as lithium hydroxide/calcium oxide mixture (LiOH/CaO), pure lithium hydroxide (LiOH), lithium methoxide (LiOMe) or sodium methoxide (NaOMe) or a homogeneous catalyst system such as isopropyl titanate (Ti(OiPr)$_4$) or dioctyltin oxide (Sn(OCt)$_2$O). The reaction is an equilibrium reaction. Therefore, the low molecular weight alcohol released is typically removed, for example by distillation.

In addition, the macromonomers can be obtained by a direct esterification proceeding, for example, from (meth) acrylic acid or (meth)acrylic anhydride, preferably under acidic catalysis by p-toluenesulfonic acid or methanesulfonic acid, or from free methacrylic acid by the DCC method (dicyclohexylcarbodiimide).

Furthermore, the present hydroxylated hydrogenated polybutadiene can be converted to an ester by reaction with an acid chloride such as (meth)acryloyl chloride.

Preferably, in the above-detailed preparations of the esters of the invention, polymerization inhibitors are used, for example the 4-hydroxy-2,2,6,6-tetramethylpiperidinooxyl radical and/or hydroquinone monomethyl ether.

The $C_{1-30}$ alkyl (meth)acrylates for use in accordance with the invention are esters of (meth)acrylic acid and straight chain or branched alcohols having 1 to 30 carbon atoms. The term "$C_{1-30}$ alkyl methacrylates" encompasses individual (meth)acrylic esters with an alcohol of a particular length, and likewise mixtures of (meth)acrylic esters with alcohols of different lengths.

Suitable $C_{1-30}$ alkyl (meth)acrylates include, for example, methyl (meth)acrylate, ethyl (meth)acrylate, n-propyl (meth)acrylate), iso-propyl (meth)acrylate, n-butyl (meth) acrylate, iso-butyl (meth)acrylate, tert-butyl (meth)acrylate, pentyl (meth)acrylate, hexyl (meth)acrylate, heptyl (meth) acrylate, octyl (meth)acrylate, nonyl (meth)acrylate, 2-butyloctyl (meth)acrylate, 2-hexyloctyl (meth)acrylate, decyl (meth)acrylate, 2-butyldecyl (meth)acrylate, 2-hexyldecyl (meth)acrylate, 2-octyldecyl (meth)acrylate, undecyl (meth) acrylate, 5-methylundecyl (meth)acrylate, dodecyl (meth) acrylate, 2-methyldodecyl (meth)acrylate, 2-hexyldodecyl (meth)acrylate, 2-octyldodecyl (meth)acrylate, tridecyl (meth)acrylate, 5-methyltridecyl (meth)acrylate, tetradecyl (meth)acrylate, 2-decyltetradecyl (meth)acrylate, pentadecyl (meth)acrylate, hexadecyl (meth)acrylate, 2-methylhexadecyl (meth)acrylate, 2-dodecylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth) acrylate, octadecyl (meth)acrylate, 2-decyloctadecyl (meth) acrylate, 2-tetradecyloctadecyl (meth)acrylate, nonadecyl (meth)acrylate, eicosyl (meth)acrylate, cetyleicosyl (meth) acrylate, stearyleicosyl (meth)acrylate, docosyl (meth)acrylate and/or eicosyltetratriacontyl (meth)acrylate. 2-decyltetradecyl (meth)acrylate, 2-decyloctadecyl (meth)acrylate, 2-dodecyl-1-hexadecyl (meth)acrylate, 1,2-octyl-1-dodecyl (meth)acrylate, 2-tetradecylocadecyl (meth)acrylate, 1,2-tetradecyl-octadecyl (meth)acrylate and 2-hexadecyl-eicosyl (meth)acrylate.

Suitable styrene monomers are selected from the group consisting of styrene, substituted styrenes having an alkyl substituent in the side chain, for example alpha-methylstyrene and alpha-ethylstyrene, substituted styrenes having an alkyl substituent on the ring, such as vinyltoluene and para-methylstyrene, halogenated styrenes, for example monochlorostyrenes, dichlorostyrenes, tribromostyrenes and tetrabromostyrenes; styrene being preferred.

The $C_{1-4}$-alkyl (meth)acrylates for use in accordance with the invention are esters of (meth)acrylic acid and straight chained or branched alcohols having 1 to 4 carbon atoms. The term "$C_{1-4}$-alkyl (meth)acrylates" encompasses individual (meth)acrylic esters with an alcohol of a particular length, and likewise mixtures of (meth)acrylic esters with alcohols of different lengths.

Suitable $C_{1-4}$-alkyl (meth)acrylates include, for example, methyl (meth)acrylate, ethyl (meth)acrylate, n-propyl (meth)acrylate), iso-propyl (meth)acrylate, n-butyl (meth) acrylate, iso-butyl (meth)acrylate and tert-butyl (meth)acrylate. Particularly preferred $C_{1-4}$-alkyl (meth)acrylates are methyl (meth)acrylate and n-butyl (meth)acrylate; methyl methacrylate and n-butyl methacrylate are especially preferred.

The $C_{10-30}$ alkyl (meth)acrylates for use in accordance with the invention are esters of (meth)acrylic acid and straight chain or branched alcohols having 10 to 30 carbon atoms. The term "$C_{10-30}$ alkyl methacrylates" encompasses individual (meth)acrylic esters with an alcohol of a particular length, and likewise mixtures of (meth)acrylic esters with alcohols of different lengths.

Suitable $C_{10-30}$ alkyl (meth)acrylates include, for example, 2-butyloctyl (meth)acrylate, 2-hexyloctyl (meth) acrylate, decyl (meth)acrylate, 2-butyldecyl (meth)acrylate, 2-hexyldecyl (meth)acrylate, 2-octyldecyl (meth)acrylate, undecyl (meth)acrylate, 5-methylundecyl (meth)acrylate, dodecyl (meth)acrylate, 2-methyldodecyl (meth)acrylate, 2-hexyldodecyl (meth)acrylate, 2-octyldodecyl (meth)acrylate, tridecyl (meth)acrylate, 5-methyltridecyl (meth)acrylate, tetradecyl (meth)acrylate, 2-decyltetradecyl (meth) acrylate, pentadecyl (meth)acrylate, hexadecyl (meth) acrylate, 2-methylhexadecyl (meth)acrylate, 2-dodecylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, 2-decyloctadecyl (meth)acrylate, 2-tetradecyloctadecyl (meth)acrylate, nonadecyl (meth)acrylate, eicosyl (meth) acrylate, cetyleicosyl (meth)acrylate, stearyleicosyl (meth) acrylate, docosyl (meth)acrylate and/or eicosyltetratriacontyl (meth)acrylate. 2-decyl-tetradecyl (meth)acrylate, 2-decyloctadecyl (meth)acrylate, 2-dodecyl-1-hexadecyl (meth)acrylate, 1,2-octyl-1-dodecyl (meth)acrylate, 2-tetradecylocadecyl (meth)acrylate, 1,2-tetradecyl-octadecyl (meth)acrylate and 2-hexadecyl-eicosyl (meth)acrylate.

The $C_{10-15}$ alkyl methacrylates for use in accordance with the invention are esters of methacrylic acid and alcohols having 10 to 15 carbon atoms. The term "$C_{10-15}$ alkyl methacrylates" encompasses individual methacrylic esters with an alcohol of a particular length, and likewise mixtures of methacrylic esters with alcohols of different lengths.

Suitable $C_{10-15}$ alkyl methacrylates include, for example, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate and/or pentadecyl methacrylate.

Particularly preferred $C_{10-15}$ alkyl methacrylates are methacrylic esters of a linear $C_{12-14}$ alcohol mixture ($C_{12-14}$ alkyl methacrylate).

The method according to the present invention is a free-radical polymerization. Customary free-radical polymerization is explained, inter alia, in Ullmanns's Encyclopedia of Industrial Chemistry, Sixth Edition. In general, a polymerization initiator and a chain transfer agent are used for this purpose. In the process according to the present invention, the use of chain transfer agents is not necessary.

In accordance with the present invention, an initiator 1 is added to monomer mixtures 1, 2 and 3 in amounts of 0.1% to 0.5% by weight, preferably 0.1% to 0.3% by weight, based on the total amount of monomers used in the reaction. A further amount of 0.05% to 0.15% by weight, based on the total amount of monomers, of an initiator 2 can optionally be added at the end of the reaction.

Initiator 1 and 2 may be the same or different and are independently selected from the group consisting of azo initiators, such as azobis-isobutyronitrile (AIBN), 2,2'-azobis(2-methylbutyronitrile) (AMBN) and 1,1-azobiscyclohexanecarbonitrile, and peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide and bis(4-tert-butylcyclohexyl) peroxydicarbonate.

Preferably, initiator 1 and 2 are independently selected from the group consisting of 2,2'-azobis(2-methylbutyronitrile), tert-butylperoxy 2-ethylhexanoate, 1,1-di-tert-butylperoxy-3,3,5-trimethylcyclohexan, tert-butyl peroxybenzoate and tert-butylperoxy-3,5,5-trimethylhexanoat. Especially preferred is used 1,1-di-tert-butylperoxy-3,3,5-trimethylcyclohexan as initiator 1 and tert-butylperoxy 2-ethylhexanoate as initiator 2.

The polymerization may be carried out at standard pressure, reduced pressure or elevated pressure. The polymerization temperature is generally in the range of 20° to 200° C., preferably 900 to 100° C.

The polymerization is carried out with a solvent. The term solvent is to be understood here in a broad sense. The solvent is selected according to the polarity of the monomers used, preference being given to using API group III oil, relatively light gas oil and/or aromatic hydrocarbons, for example toluene or xylene.

The polymerization is carried out in a suitable reaction vessel that is equipped with a stirrer and a temperature control system under nitrogen atmosphere.

The base oil to be used in the present invention comprises an oil of lubricating viscosity. Such oils include natural and synthetic oils, oil derived from hydrocracking, hydrogenation, and hydro-finishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups 1, 11 and Ill are mineral oils which are classified by the amount of saturates and sulphur they contain and by their viscosity indices; Group IV are polyalphaolefins; and Group V are all others, including e.g. ester oils. The table below illustrates these API classifications.

| Group | Saturates | Sulphur content | Viscosity Index (VI) |
|---|---|---|---|
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

The kinematic viscosity at 100° C. ($KV_{100}$) of appropriate apolar base oils used to prepare an additive composition or lubricating composition in accordance with the present invention is preferably in the range of 3 mm$^2$/s to 10 mm$^2$/s, more preferably in the range of 4 mm$^2$/s to 8 mm$^2$/s, according to ASTM D445.

Further base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156, WO 01/57166 and WO 2013/189951.

Especially for the method according to the present invention are used base oils of API Group III, API Group V and mixtures thereof; preferred are mixtures of API Group III and API Group V base oils. As Group V base oils are preferably be used dioctylsebacate (DIOS) or Berylane.

A further object of the present invention is therefore directed to a method for preparing the polyalkyl (meth) acrylates as outlined further above, wherein
mixture 1 comprises 65% to 75% by weight of API Group III oil or mixtures thereof and 25% to 35% by weight of Group V base oil and mixtures thereof, based on the total amount of base oil used in mixture 1;
mixture 2 comprises 65% to 75% by weight of API Group III oil or mixtures thereof and 25% to 35% by weight of Group V base oil and mixtures thereof, based on the total amount of base oil used in mixture 2; and mixture 3 comprises 100% by weight of API Group III oil or mixtures thereof, based on the total amount of base oil used in mixture 3.

A further object of the present invention is directed to a method for the preparation of polyalkyl (meth)acrylate polymers, wherein the polyalkyl (meth)acrylate polymer comprises:
(a) 8 to 25% by weight of esters of (meth)acrylic acid and hydroxylated hydrogenated polybutadienes;
(b1) 60% 80% of $C_{1-4}$ alkyl (meth)acrylates;
(b2) 10% to 20% by weight of $C_{10-30}$ alkyl (meth) acrylates, preferably $C_{10-15}$ alkyl methacrylates, more preferably $C_{12-14}$ alkyl methacrylates; and
(b3) 0% to 10% by weight of styrene,
the method comprising the steps of:
(i) preparing a monomer mixture 1 comprising 115 to 125% of the targeted content of monomers (a) and 95% to 100% of the targeted content of monomers (b), the concentration of the monomers in mixture 1 being 30 to 40%;
(ii) adding a monomer mixture 2 comprising 115 to 125% of the targeted content of monomers (a) and 95% to 100% of the targeted content of monomers (b), the concentration of the monomers in mixture 2 being 30 to 40%; and
(iii) adding a monomer mixture 3 comprising 110 to 120% of the targeted content of only monomers (b), the concentration of the monomers in mixture 2 being 2 to 6%, characterized in that monomer mixture 1 comprises 38 to 45% of the total amount of monomers used in the process, monomer mixture 2 comprises 38 to 45% of the total amount of monomers used in the process and monomer mixture 3 comprises 15 to 20% of the total amount of monomers used in the process, wherein
mixture 1 comprises 65% to 75% by weight of API Group III oil or mixtures thereof and 25% to 35% by weight of Group V base oil and mixtures thereof, based on the total amount of base oil used in mixture 1;
mixture 2 comprises 65% to 75% by weight of API Group III oil or mixtures thereof and 25% to 35% by weight of Group V base oil and mixtures thereof, based on the total amount of base oil used in mixture 2; and
mixture 3 comprises 100% by weight of API Group III oil or mixtures thereof, based on the total amount of base oil used in mixture 3.

A further object of the present invention is directed to a method for the preparation of polyalkyl (meth)acrylate, wherein the polyalkyl (meth)acrylate polymer comprises:
(a) 8 to 25% by weight of esters of (meth)acrylic acid and hydroxylated hydrogenated polybutadienes;
(b1) 60% to 80% of $C_{1-4}$ alkyl (meth)acrylates;
(b2) 10% to 20% by weight of $C_{10-30}$ alkyl (meth) acrylates, preferably $C_{10-15}$ alkyl methacrylates, more preferably $C_{12-14}$ alkyl methacrylates; and
(b3) 0% to 10% by weight of styrene;
the method comprising the steps of:
(i) preparing a monomer mixture 1 comprising 8% to 17% by weight of monomers (a), 70% to 75% by weight of monomers (b1), 12% to 17% by weight of monomers (b2) and 0% to 1% by weight of monomers (b3), based on the total amount of monomers in mixture 1, in a base oil, the concentration of the monomers in mixture 1 being 30 to 40%;
(ii) adding a monomer mixture 2 comprising 8% to 17% by weight of monomers (a), 70% to 75% by weight of monomers (b1), 12% to 17% by weight of monomers (b2) and 0% to 1% by weight of monomers (b3), based on the total amount of monomers in mixture 2, in a base oil, the concentration of the monomers in mixture 2 being 30 to 40%; and
(iii) adding a monomer mixture 3 comprising 81% to 86% by weight of monomers (b1) and 15 to 19% by weight of monomers (b2), based on the total amount of monomers in mixture 3, in a base oil, the concentration of the monomers in mixture 3 being 2 to 6%.

characterized in that monomer mixture 1 comprises 38 to 45% of the total amount of monomers used in the process monomer mixture 2 comprises 38 to 45% of the total amount of monomers used in the process and monomer mixture 3 comprises 15 to 20% of the total amount of monomers used in the process, wherein
mixture 1 comprises 65% to 75% by weight of API Group III oil or mixtures thereof and 25% to 35% by weight of Group V base oil and mixtures thereof, based on the total amount of base oil used in mixture 1;
mixture 2 comprises 65% to 75% by weight of API Group III oil or mixtures thereof and 25% to 35% by weight of Group V base oil and mixtures thereof, based on the total amount of base oil used in mixture 2; and
mixture 3 comprises 100% by weight of API Group III oil or mixtures thereof, based on the total amount of base oil used in mixture 3.

A further object is directed to a method as described further above, wherein the polyalkyl (meth)acrylate polymer comprises:
(a) 8 to 15% by weight of esters of (meth)acrylic acid and hydroxylated hydrogenated polybutadienes;
(b1) 70% to 80% of $C_{1-4}$ alkyl (meth)acrylates;
(b2) 10% to 20% by weight of $C_{10-30}$ alkyl (meth) acrylates, preferably $C_{10-15}$ alkyl methacrylates, more preferably $C_{12-14}$ alkyl methacrylates; and
(b3) 0% to 1% by weight of styrene.

A further first object is directed to the method as described further above, wherein the polyalkyl (meth)acrylate polymer comprises:
(a) 8 to 15% by weight of esters of (meth)acrylic acid and hydroxylated hydrogenated polybutadienes;
(b1) 70% to 80% of $C_{1-4}$ alkyl methacrylates;
(b2) 10% to 20% by weight of ably $C_{10-15}$ alkyl methacrylates, more preferably $C_{12-14}$ alkyl methacrylates; and
(b3) 0% to 1% by weight of styrene.

The content of each component (a), (b1), (b2) and (b3) is based on the total composition of the polyalkyl (meth) acrylate polymer.

In a particular embodiment, the proportions of components (a), (b1), (b2) and (b3) add up to 100% by weight.

A second object of the present invention is directed to the polyalkyl (meth)acrylates prepared according to the method as outlined further above.

The polymers prepared according to the method of the present invention are characterized by their contribution to low $KV_{40}$, $HTHS_{80}$ and $HTHS_{100}$ values (e.g. at a given $HTHS_{150}$ of 2.6 mPas) of lubricating oil compositions comprising them.

The polyalkyl(meth)acrylate polymers prepared according to the method of the present invention can therefore be used in all common grades of motor oils having the viscosity characteristics defined in the document SAE J300.

A third object of the present invention is therefore directed to the use of polyalkyl(meth)acrylate polymers prepared according to the method of the present invention to improve the kinematic viscosity and HTHS performance of lubricating oil compositions, especially of engine oil formulations.

A fourth object of the present invention is directed to an additive composition comprising:
- (A1) 40 to 76% by weight, preferably 56% to 67% by weight, of API Group III oils and mixtures thereof;
- (A2) 4% to 20% by weight, preferably 8% to 14% by weight, of API Group V oils or mixtures thereof; and
- (B) 20% to 40% by weight, preferably 25% to 30% by weight, of a polyalkyl(meth)acrylate polymer prepared according to the method as described herein before.

The content of each component (A1), (A2) and (B) is based on the total composition of the additive composition.

In a particular embodiment, the proportions of components (A1), (A2) and (B) add up to 100% by weight.

The base oil to be used in the additive composition comprises an oil of lubricating viscosity as described further above.

A fifth object of the present invention is directed to the use of an additive composition comprising at least one polyalkyl (meth)acrylate polymer prepared according to the method of the present invention and a base oil to improve the kinematic viscosity and HTHS performance of lubricating oil compositions, especially of engine oil formulations.

The invention has been illustrated by the following non-limiting examples.

Experimental Part

Abbreviations

Group V oil synthetic base oil from Total with a $KV_{40}$ of 2.3 cSt
$C_{12-14}$ AMA $C_{12-14}$-alkyl methacrylate
CCS cold cranking stability
$HTHS_{80}$ high-temperature high-shear viscosity@80° C., measured according to CEC L-036
$HTHS_{100}$ high-temperature high-shear viscosity@100° C., measured according to CEC L-036
$HTHS_{150}$ high-temperature high-shear viscosity@150° C., measured according to CEC L-036
KV kinematic viscosity measured according to ASTM D445
$KV_{40}$ kinematic viscosity@40° C., measured according to ISO 3104
$KV_{100}$ kinematic viscosity@100° C., measured according to ISO 3104
LMA lauryl methacrylate;
MM macromonomer
MMA methyl methacrylate
$M_n$ number-average molecular weight
$M_w$ weight-average molecular weight
NB 3020 Nexbase® 3020, Group III base oil from Neste with a $KV_{100}$ of 2.2 cSt
NB 3043 Nexbase® 3043, Group III base oil from Neste with a $KV_{100}$ of 4.3 cSt
Nexbase® 3080, Group III base oil from Neste with a $KV_{100}$ of 8 cSt
nBMA n-butyl methacrylate
OLOA 55516 DI Package for PCMO commercially available from Oronite
PAO4 polyalphaolefin base oil with a $KV_{100}$ of 4 cSt
PCMO Passenger car motor oils
PDI Polydispersity index
PPD pour point depressant
Sty styrene
VI viscosity index, measured according to ISO 2909
VPL® 1-300 pour point depressant commercially available from Evonik
Yubase 4+ Group III base oil from SK Lubricants with a $KV_{100}$ of 4.2 cSt Test Methods The polyalkyl (meth)acrylate polymers according to the present invention and the comparative examples were characterized with respect to their molecular weight and PDI.

Molecular weights were determined by size exclusion chromatography (SEC) using commercially available polymethylmethacrylate (PMMA) standards. The determination is affected by gel permeation chromatography with THE as eluent (flow rate: 1 mL/min; injected volume: 100 µl).

The additive compositions including the polyalkyl (meth) acrylate polymers according to the present invention and comparative examples were characterized with respect to their viscosity index (VI) to ASTM D 2270, kinematic viscosity at 40° C. ($KV_{40}$) and 100° C. ($KV_{100}$) to ASTM D445 and with respect to their solubility.

The lubricating oil compositions including the comb polymers according to the present invention and comparative examples were characterized with respect to kinematic viscosity at 40° C. ($KV_{40}$) and 100° C. ($KV_{100}$) to ASTM D445, the viscosity index (VI) to ASTM D 2270, high-temperature high-shear viscosity at 80° C., 100° C. and 150° C. to CEC L-036 and with respect to their solubility.

To show the shear stability of the lubricating oil compositions, the PSSI (Permanent Shear Stability Index) was calculated according to ASTM D 6022-01 (Standard Practice for Calculation of Permanent Shear Stability Index) based on data measured according to ASTM D 2603-B (Standard Test Method for Sonic Shear Stability of Polymer-Containing Oils, ultrasound treatment for 12.5 min).

The solubility of the additive compositions was tested in solutions of 25% polymer in Group III oil; the solubility of the lubricating oil compositions was tested in solutions of 3.75% polymer in PAO4. The solutions were analyzed photometrically after cooling down to room temperature for at least 1 day and the haze value was obtained using a Hunter LAB XE device and software. When measuring haze, the percentage of light diffusely scattered compared to the total light transmitted is reported. When the Haze level is below 5 the sample appears completely clear by eye and are considered to show very good solubility in lubricant formulations. At Haze levels between 5-10, the sample appears slightly hazy and the products are considered to show only medium solubility in lubricant formulations. At HAZE levels above 10, the sample appears obviously hazy and the products are considered to have a poor solubility in lubricant formulations.

Synthesis of a Hydroxylated Hydrogenated Polybutadiene

The macroalcohol prepared was a hydroxypropyl-terminated hydrogenated polybutadiene having a mean molar mass $M_n$=4750 g/mol.

The macroalcohol was synthesized by an anionic polymerization of 1,3-butadiene with butyllithium at 20-45° C. On attainment of the desired degree of polymerization, the reaction was stopped by adding propylene oxide and lithium was removed by precipitation with methanol. Subsequently, the polymer was hydrogenated under a hydrogen atmosphere in the presence of a noble metal catalyst at up to 140° C. and pressure of 200 bar. After the hydrogenation had ended, the noble metal catalyst was removed, and organic solvent was drawn off under reduced pressure. Finally, the base oil NB 3020 was used for dilution to a polymer content of 70% by weight.

The vinyl content of the macroalcohol was 61%, the hydrogenation level >99% and the OH functionality >98%. These values were determined by H-NMR (nuclear resonance spectroscopy).

Synthesis of Macromonomer (MM)

In a 2 L stirred apparatus equipped with saber stirrer, air inlet tube, thermocouple with controller, heating mantle, column having a random packing of 3 mm wire spirals, vapor divider, top thermometer, reflux condenser and substrate cooler, 1000 g of the above-described macroalcohol are dissolved in 450 g of methyl methacrylate (MMA) by stirring at 60° C. Added to the solution are 20 ppm of 2,2,6,6-tetramethylpiperidin-1-oxyl radical and 200 ppm of hydroquinone monomethyl ether. After heating to MMA reflux (bottom temperature about 110° C.) while passing air through for stabilization, about 20 g of MMA are distilled off for azeotropic drying. After cooling to 95° C., 0.30 g of $LiOCH_3$ is added and the mixture is heated back to reflux. After the reaction time of about 1 hour, the top temperature has fallen to ~64° C. because of methanol formation. The methanol/MMA azeotrope formed is distilled off constantly until a constant top temperature of about 100° C. is established again. At this temperature, the mixture is left to react for a further hour. For further workup, the bulk of MMA is drawn off under reduced pressure. Insoluble catalyst residues are removed by pressure filtration (Seitz T1000 depth filter). The content of NB 3020 "entrained" into the copolymer syntheses described further down was taken into account accordingly.

Synthesis of Comb Polymers

TABLE 1

Net monomer compositions of the comb polymers prepared according to the present invention.

| Ex. # | MM [%] | MMA [%] | nBMA [%] | LMA [%] | Sty [%] |
|---|---|---|---|---|---|
| 1 (CE) | 15.0 | 0.2 | 69.4 | 15.2 | 0.2 |
| 2 | 15.0 | 0.2 | 71.4 | 13.2 | 0.2 |
| 3 | 14.0 | 0.2 | 71.9 | 13.7 | 0.2 |
| 4 | 13.0 | 0.2 | 72.4 | 14.2 | 0.2 |
| 5 | 12.0 | 0.2 | 72.9 | 14.7 | 0.2 |
| 6 | 11.0 | 0.2 | 73.4 | 15.2 | 0.2 |
| 7 | 10.0 | 0.2 | 73.9 | 15.7 | 0.2 |

Polymer 1 (Original Process—Comparative Example):

An apparatus with 4-neck flask and precision glass saber stirrer was initially charged with a monomer mixture 1. (=heel) having the following composition: 15% of macromonomer (70% in NB3020), 15.2% of LMA, 69.4% of nBMA, 0.2% of styrene and 0.2% of MMA, based on the total amount of monomers. An oil mixture of NB3043 and Group V oil was added to achieve a concentration of monomers in oil of 40%. The resulting reaction mixture contained 60% of an oil mixture comprising 4.3% by weight of NB3020, 66.9% by weight of NB3043 and 28.8% by weight of Group V base oil, based on the total amount of the oil composition. After heating to 95° C. under nitrogen, 0.15%, based on the total amount of monomers, of 1,1-di-tert-butylperoxy-3,3,5-trimethylcyclohexan was added and the temperature maintained.

Subsequently, a monomer mixture 2 (=feed) comprising 15% of macromonomer (70% in NB3020), 15.2% of LMA, 69.4% of nBMA, 0.2% of styrene and 0.2% of MMA, based on the total amount of monomers, and 0.2% by weight, based on the total amount of monomers present in the feed, of 1,1-di-tert-butylperoxy-3,3,5-trimethylcyclohexan in an oil mixture comprising NB3043 and Group V oil was added within 3 hours with constant dosing rate. Monomer mixture 2 contained 40% of monomers and 60% of an oil mixture comprising 4.3% by weight of NB3020, 66.9% by weight of NB3043 and 28.8% by weight of Group V oil, based on the total amount of the oil composition. The reaction mixture obtained was further maintained at 96° C. for another two hours. Subsequently, another 0.2%, based on the total amount of monomers, of 1,1-di-tert-butylperoxy-3,3,5-trimethylcyclohexan was added and the resulting reaction mixture was diluted to 30% solids with NB3043 within 3 hours. Then the reaction mixture received was again maintained at 96° C. for further 2 hours and after this, another 0.1%, based on the total amount of monomers, of tert-butylperoxy-2-ethyl-hexanoate was added and the mixture was stirred at 95° C. overnight. The next day, the mixture was diluted to 25% polymer with NB3043.

After quickly cooling down the mixture it showed slightly inhomogeneous and gel-like appearance.

TABLE 2

Composition of monomer mixtures used for the preparation of Polymer 1.

| Monomer | Heel [%] | Feed [%] |
|---|---|---|
| Macromonomer | 15.0 | 15.0 |
| LMA | 15.2 | 15.2 |
| nBMA | 69.4 | 69.4 |
| Styrene | 0.2 | 0.2 |
| DMAEMA | — | — |
| MMA | 0.2 | 0.2 |
| Sum | 100 | 100 |
| Solids content | 40 | 40 |
| Oil content | 60 | 60 |
| Sum | 100 | 100 |
| NB3020 | 4.3 | 4.3 |
| NB3043 | 66.9 | 66.9 |
| Group V oil | 28.8 | 28.8 |
| Split of monomers | 50 | 50 |

Polymer 2 (Split-Feed Process):

An apparatus with 4-neck flask and precision glass saber stirrer was initially charged with a monomer mixture 1. (=heel) having the following composition: 18.1% of macromonomer (70% in NB3020), 12.7% of LMA, 58.8% of nBMA, 0.2% of styrene and 0.2% of MMA, based on the total weight of the monomer composition. An oil mixture of NB3043 and Group V oil was added to achieve a concentration of monomers in oil of 35.4%. The resulting reaction mixture contained 64.6% of an oil mixture comprising 4.3% by weight of NB3020, 66.9% by weight of NB3043 and 28.8% by weight of Group V oil, based on the total amount of the oil composition. After heating to 96° C. under nitrogen, 0.15%, based on the total amount of monomers, of 1,1-di-tert-butylperoxy-3,3,5-trimethylcyclohexan was added and the temperature maintained.

Subsequently, a monomer mixture 2 (=Feed 1) comprising 18.1% of macromonomer (70% in NB3020), 12.7% of LMA, 68.8% of nBMA, 0.2% of styrene and 0.2% of MMA, based on the total amount of monomers, and 0.2%, based on the total amount of monomers, of 1,1-di-tert-butylperoxy-3,3,5-trimethylcyclohexan in an oil mixture comprising NB3043 and Group V oil was added within 3 hours with constant dosing rate. Monomer mixture 2 contained 35.4% of monomers and 64.6% of an oil mixture comprising 4.3% by weight of NB3020, 66.9% by weight of NB3043 and 28.8% by weight of Group V oil, based on the total amount of the oil composition.

Subsequently, a monomer mixture 3 (=Feed 2) comprising 15.6% of LMA and 84.4% of nBMA, based on the total amount of monomers, and 0.2%, based on the total amount of monomers, of 1,1-di-tert-butylperoxy-3,3,5-trimethylcyclohexan and NB3043 was added within 3 hours with constant dosing rate. Monomer mixture 3 contained 4.25% of monomers and 95.75% of NB3043. At the end of the addition, the reaction mixture exhibited 30% solids.

Then the reaction was again maintained at 9600 for another 2 h and after this another 0.1%, based on the total amount of monomers, of tert-butylperoxy-2-ethyl-hexanoate was added and the mixture was stirred at 9600 overnight. The next day, the mixture was diluted to 25% solids with NB3043.

TABLE 3

Composition of monomer mixtures used for the preparation of Polymer 2.

| Monomer | Heel [%] | Feed 1 [%] | Feed 2 [%] |
|---|---|---|---|
| Macromonomer | 18.1 | 18.1 | 0 |
| LMA | 12.7 | 12.7 | 15.6 |
| nBMA | 68.8 | 68.8 | 84.4 |
| Styrene | 0.2 | 0.2 | 0 |
| MMA | 0.2 | 0.2 | 0 |
| Sum | 100 | 100 | 100 |
| Solids content | 35.4 | 35.4 | 4.25 |
| Oil content | 64.6 | 64.6 | 95.75 |
| Sum | 100 | 100 | 100 |
| NB3020 | 4.3 | 4.3 | 0 |
| NB3043 | 66.9 | 66.9 | 100 |
| Group V oil | 28.8 | 28.8 | 0 |
| Split of monomers | 41.14 | 41.14 | 17.72 |

Polymer 3 (Split-Feed Process):

Polymer 3 was prepared according to the protocol given for Polymer 2. The monomer mixture used is outlined in the following Table 4.

TABLE 4

Composition of monomer mixtures used for the preparation of Polymer 3.

| Monomer | Heel [%] | Feed 1 [%] | Feed 2 [%] |
|---|---|---|---|
| Macromonomer | 16.9 | 16.9 | 0 |
| LMA | 13.2 | 13.2 | 16.0 |
| nBMA | 69.4 | 69.4 | 84.0 |
| Styrene | 0.2 | 0.2 | 0 |
| MMA | 0.2 | 0.2 | 0 |
| Sum | 100 | 100 | 100 |
| Solids content | 35.4 | 35.4 | 4.25 |
| Oil content | 64.6 | 64.6 | 95.75 |
| Sum | 100 | 100 | 100 |
| NB3020 | 4.0 | 4.0 | 0 |
| NB3043 | 67.2 | 67.2 | 100 |
| Group V oil | 28.8 | 28.8 | 0 |
| Split of monomers | 41.14 | 41.14 | 17.72 |

Polymer 4 (Split-Feed Process):

Polymer 4 was prepared according to the protocol given for Polymer 2. The monomer mixture used is outlined in the following Table 5.

TABLE 5

Composition of monomer mixtures used for the preparation of Polymer 4.

| Monomer | Heel [%] | Feed 1 [%] | Feed 2 [%] |
|---|---|---|---|
| Macromonomer | 15.7 | 15.7 | 0 |
| LMA | 13.8 | 13.8 | 16.4 |
| nBMA | 70.1 | 70.1 | 83.6 |
| Styrene | 0.2 | 0.2 | 0 |
| MMA | 0.2 | 0.2 | 0 |
| Sum | 100 | 100 | 100 |
| Solids content | 35.4 | 35.4 | 4.25 |
| Oil content | 64.6 | 64.6 | 95.75 |
| Sum | 100 | 100 | 100 |
| NB3020 | 3.7 | 3.7 | 0 |
| NB3043 | 67.5 | 67.5 | 100 |
| Group V oil | 28.8 | 28.8 | 0 |
| Split of monomers | 41.14 | 41.14 | 17.72 |

Polymer 5 (Split-Feed Process):

Polymer 5 was prepared according to the protocol given for Polymer 2. The monomer mixture used is outlined in the following Table 6.

TABLE 6

Composition of monomer mixtures used for the preparation of Polymer 5.

| Monomer | Heel [%] | Feed 1 [%] | Feed 2 [%] |
|---|---|---|---|
| Macromonomer | 14.6 | 14.6 | 0 |
| LMA | 14.3 | 14.3 | 16.8 |
| nBMA | 70.7 | 70.7 | 83.2 |
| Styrene | 0.2 | 0.2 | 0 |
| MMA | 0.2 | 0.2 | 0 |
| Sum | 100 | 100 | 100 |
| Solids content | 35.4 | 35.4 | 4.25 |
| Oil content | 64.6 | 64.6 | 95.75 |
| Sum | 100 | 100 | 100 |
| NB3020 | 3.4 | 3.4 | 0 |

TABLE 6-continued

Composition of monomer mixtures used for the preparation of Polymer 5.

| Monomer | Heel [%] | Feed 1 [%] | Feed 2 [%] |
|---|---|---|---|
| NB3043 | 67.8 | 67.8 | 100 |
| Group V oil | 28.8 | 28.8 | 0 |
| Split of monomers | 41.14 | 41.14 | 17.72 |

TABLE 7

Composition of monomer mixtures used for the preparation of Polymer 6.

| Monomer | Heel [%] | Feed 1 [%] | Feed 2 [%] |
|---|---|---|---|
| Macromonomer | 13.4 | 13.4 | 0 |
| LMA | 14.8 | 14.8 | 17.2 |
| nBMA | 71.4 | 71.4 | 82.8 |
| Styrene | 0.2 | 0.2 | 0 |
| MMA | 0.2 | 0.2 | 0 |
| Sum | 100 | 100 | 100 |
| Solids content | 35.4 | 35.4 | 4.4 |
| Oil content | 64.6 | 64.6 | 95.6 |
| Sum | 100 | 100 | 100 |
| NB3020 | 3.1 | 3.1 | 0 |
| NB3043 | 68.1 | 68.1 | 100 |
| Group V oil | 28.8 | 28.8 | 0 |
| Split of monomers | 41.14 | 41.14 | 17.72 |

Polymer 7 (Split-Feed Process):

Polymer 7 was prepared according to the protocol given for Polymer 2. The monomer mixture used is outlined in the following Table 8.

TABLE 8

Composition of monomer mixtures used for the preparation of Polymer 7.

| Monomer | Heel [%] | Feed 1 [%] | Feed 2 [%] |
|---|---|---|---|
| Macromonomer | 12.2 | 12.2 | 0 |
| LMA | 15.3 | 15.3 | 17.5 |
| nBMA | 72.0 | 72.0 | 82.5 |
| Styrene | 0.2 | 0.2 | 0 |
| MMA | 0.2 | 0.2 | 0 |
| Sum | 100 | 100 | 100 |
| Solids content | 35.4 | 35.4 | 4.25 |
| Oil content | 64.6 | 64.6 | 95.75 |
| Sum | 100 | 100 | 100 |
| NB3020 | 2.8 | 2.8 | 0 |
| NB3043 | 68.4 | 68.4 | 100 |
| Group V oil | 28.8 | 28.8 | 0 |
| Split of monomers | 41.14 | 41.14 | 17.72 |

TABLE 9

Net compositions of the comb polymers prepared according to the present invention.

| Ex. # | MM [%] | MMA [%] | nBMA [%] | LMA [%] | Sty [%] |
|---|---|---|---|---|---|
| 1 (CE) | 12.9 | 0.2 | 71.1 | 15.6 | 0.2 |
| 2 | 13.7 | 0.2 | 72.5 | 13.4 | 0.2 |
| 3 | 12.9 | 0.2 | 72.8 | 13.9 | 0.2 |
| 4 | 12.0 | 0.2 | 73.3 | 14.4 | 0.2 |
| 5 | 11.2 | 0.2 | 73.6 | 14.8 | 0.2 |
| 6 | 10.1 | 0.2 | 74.1 | 15.4 | 0.2 |
| 7 | 9.2 | 0.2 | 74.6 | 15.8 | 0.2 |

Table 9 shows that with the split-feed process of the present invention the average content of the apolar macromonomer could be reduced by 3.5% (from 12.9% in Polymer 1 to only 9.2% in Polymer 7) where at the same time the content of the polar monomer BMA could be increased by 3.5% (from 71.1% in Polymer 1 to 74.6% in Polymer 7).

TABLE 10

Characteristics of Polymers 1-7.

| Polymer | Content [%] | $M_n$ [g/mol] | $M_w$ [g/mol] | D |
|---|---|---|---|---|
| 1 | 25 | 145,000 | 696,000 | 4.8 |
| 2 | 25 | 137,000 | 559,000 | 4.1 |
| 3 | 25 | 109,000 | 598,000 | 5.5 |
| 4 | 25 | 93,700 | 530,000 | 5.7 |
| 5 | 25 | 87,900 | 578,000 | 6.5 |
| 6 | 25 | 80,600 | 543,000 | 6.7 |
| 7 | 25 | 132,000 | 690,000 | 5.2 |

Table 10 shows that the polymers obtained by the process according to the invention have high molecular weights ranging from 500,000 to 700,000 g/mol.

TABLE 11

Viscosities of 3.75% Polymers 1-7 in a Group III base oil mixture (NB 3043 and NB 3080 from Neste) with $KV_{100}$ of 4.9 cSt.

| Polymer | Content [%] | $KV_{100}$ [mm²/s] | $KV_{40}$ [mm²/s] | VI | PSSI | HAZE*[)] |
|---|---|---|---|---|---|---|
| 1 | 15 | 8.88 | 28.23 | 323 | 1.2 | 10.4 |
| 2 | 15 | 8.07 | 27.91 | 288 | 0.9 | 0.4 |
| 3 | 15 | 8.12 | 27.93 | 290 | 1.9 | 3.0 |
| 4 | 15 | 7.93 | 27.76 | 282 | 1.3 | 3.2 |
| 5 | 15 | 7.82 | 27.43 | 281 | 0.3 | 6.6 |
| 6 | 15 | 7.72 | 27.48 | 275 | 1.4 | 3.7 |
| 7 | 15 | 7.68 | 27.50 | 272 | 0.7 | 5.5 |

*[)]Determined from a composition of 3.75% polymer in PAO4.

According to Table 11, the obtained viscosities measured at 15% polymer concentration give $KV_{100}$ values between 7.7 and 8.9 mm²/s, $KV_{40}$ values between 27.4 and 28.2 mm²/s and very high viscosity index ranging from 272 to 323. However, the HAZE value originating from the original synthesis process in Polymer 1 is above 10 and the polymer solution appeared hazy. In contrast, the HAZE values of the solutions of Polymers 2-7 range from 0.4-3.7 (clear appearance) to 5.5-6.6 (very slightly hazy appearance). This shows that the polymers synthesized via the process described in this invention are significantly better soluble in oil. This indicates their wide applicability in oil formulations, for example in engine oils to improve fuel efficiency.

It was not possible to produce the polymers 2-7 by using the process described for Polymer 1. Already after the production of Polymer 1 a slightly inhomogeneous and gel-like appearance was observed. Together with high HAZE values this is an indicator for borderline solubility of the polymer in the used base oil system.

For even more polar monomer compositions like used in Polymer 2-7 and applying the old process described for Polymer 1, very high in-process viscosities and gelation of the monomer mixture during the polymerization were observed and the reaction had to be stopped before full conversion of the monomers was obtained. Only by using the new polymerization process for Polymer 2-7 homogeneous polymers with low HAZE values were obtained at low in-process viscosities during the synthesis.

The problem usually arising from using known processes is that the reaction mixtures used to prepare commonly known polyalkyl (meth)acrylates contain monomers with different reactivities leading to polymers with an inhomogenous distribution of the apolar and polar monomers. If one monomer is more reactive than another second monomer, this monomer will be copolymerized in a higher amount in the beginning of the monomer feed leading to polymer compositions with increased amounts of this monomer at the beginning, while the second monomer will be enriched in the polymers formed during a later time in the feed process. The final product then contains a mixture of all the different fractions of the polymer compositions formed during the whole process, from more polar to less polar fractions as compared to the average polymer composition. Typically, these are only very small deviations. But for polymerizations where macromonomers are used the deviations are extremely large.

By using the split-feed process of the present invention it was therefore possible to produce polymers with an increased content of polar monomers, especially of BMA, and reduced content of apolar macromonomers that do still show good solubility in oil.

Evaluation of VI Improvers in Formulations

To demonstrate the effect of the polyalkyl(methacrylate) polymers according to the present invention on the $KV_{40}$ and $HTHS_{100}$ performance of lubricating oil compositions different formulation examples were prepared and the corresponding values are measured. Formulations with Yubase 4+ as base oil were prepared by using formulation target 0W20 according to SAE J300; i.e. it was formulated on an $HTHS_{150}$ target of 2.6 mPas by adding the polymers prepared according to the present invention. The resulting polymer content was typically between 2 and 2.5% by weight. Characteristic EO formulation properties ($KV_{40}$, $KV_{100}$, $HTHS_{100}$, $HTHS_{80}$) were measured and are summarized in Table 12 below.

TABLE 12

0W20 engine oil formulations A of Polymers 1-7 with DI package in Yubase 4+ as base oil, adjusted to $HTHS_{150}$ = 2.6 mPas.

| Composition | A1 | A2 | A3 | A4 | A5 | A6 | A7 |
|---|---|---|---|---|---|---|---|
| Polymer 1 [wt %] | 9.0 | — | — | — | — | — | — |
| Solids content [%] | 2.25 | — | — | — | — | — | — |
| Polymer 2 [wt %] | — | 9.0 | — | — | — | — | — |
| Solids content [%] | — | 2.25 | — | — | — | — | — |
| Polymer 3 [wt %] | — | — | 9.0 | — | — | — | — |
| Solids content [%] | — | — | 2.25 | — | — | — | — |
| Polymer 4 [wt %] | — | — | — | 9.0 | — | — | — |
| Solids content [%] | — | — | — | 2.25 | — | — | — |
| Polymer 5 [wt %] | — | — | — | — | 9.0 | — | — |
| Solids content [%] | — | — | — | — | 2.25 | — | — |
| Polymer 6 [wt %] | — | — | — | — | — | 9.0 | — |
| Solids content [%] | — | — | — | — | — | 2.25 | — |
| Polymer 7 [wt %] | — | — | — | — | — | — | 9.0 |
| Solids content [%] | — | — | — | — | — | — | 2.25 |
| PPD (VPL 1-300) [wt %] | 0.2 | 0.2 | 0.2 | 0.2 | 0.2 | 0.2 | 0.2 |
| OLOA 55516 [wt %] | 8.9 | 8.9 | 8.9 | 8.9 | 8.9 | 8.9 | 8.9 |

TABLE 12-continued

0W20 engine oil formulations A of Polymers 1-7 with DI package in Yubase 4+ as base oil, adjusted to $HTHS_{150}$ = 2.6 mPas.

| Composition | A1 | A2 | A3 | A4 | A5 | A6 | A7 |
|---|---|---|---|---|---|---|---|
| Yubase 4+ [wt %] | 81.9 | 81.9 | 81.9 | 81.9 | 81.9 | 81.9 | 81.9 |
| Sum | 100 | 100 | 100 | 100 | 100 | 100 | 100 |
| Test method | | | | | | | |
| $KV_{40}$ [mm²/s] | 27.18 | 27.17 | 27.00 | 26.87 | 26.76 | 26.84 | 26.85 |
| $KV_{100}$ [mm²/s] | 7.55 | 7.20 | 7.16 | 7.04 | 7.04 | 7.00 | 6.91 |
| VI | 269 | 249 | 250 | 244 | 245 | 242 | 237 |
| $HTHTS_{150}$ [mPas] | 2.59 | 2.57 | 2.55 | 2.55 | 2.54 | 2.54 | 2.52 |
| $HTHS_{100}$ [mPas] | 4.83 | 4.83 | 4.60 | 4.58 | 4.52 | 4.50 | 4.49 |
| $HTHS_{80}$ [mPas] | 6.96 | 7.03 | 6.98 | 6.94 | 6.90 | 6.87 | 6.82 |
| HAZE*⁾ | 10.4 | 1.1 | 3.0 | 3.2 | 6.6 | 3.7 | 5.5 |
| HAZE **⁾ | 18.6 | 4.9 | 9.1 | 8.5 | 9.5 | 9.1 | 8.7 |

*⁾measured @15% in PAO4
**⁾in full formulation

Comparison of the formulation data presented in Table 12 shows that the parameter $HTHS_{100}$ which is relevant for fuel efficiency was improved significantly from 4.83 (Polymer 1) to 4.49 (Polymer 7). Additionally, the $HTHS_{80}$ value was improved from 6.96 (Polymer 1) to 6.82 (Polymer 7) and the good low level of the $KV_{40}$ was kept. At the same time, the $KV_{100}$ level was kept at a high level well above the engine oil specification (J300; $KV_{100}$ ? 6.9 mm²/s for 0W20 formulations).

The preparation of an oil soluble polymer of this composition and molecular weight only became possible by using a split feed process where the conversion of the macromonomer over the time was improved significantly. A parameter for showing the good oil solubility is the appearance of the product and its haze value which were at a very good level for these new polymers with improved $HTHS_{100}$ values.

The process was improved by increasing the macromonomer conversion at the beginning of the reaction and increasing the BMA and LMA conversion at the end of the reaction. In order to achieve a more homogenous reaction of the monomers, in this case it was enough to increase the macromonomer concentration in the heel (and decrease it in the feed) and, at the same time, decrease the BMA and LMA concentrations in the heel (and increase it in the feed).

As a conclusion, the data presented above show that the method according to the present invention for producing polyalkyl (meth)acrylates, wherein the amounts of the different monomers are split into a heel and one or more feeds with different compositions and concentrations, results in the formation of a higher amount of polymers having a composition closer to the average polymer composition throughout the whole polymerization process.

This approach leads to products with reduced HAZE (marker for the solubility of the polymer in a given base oil) and therefore improved solubility of the polymers in lubricant formulations, especially in engine oil formulations, improved up-scalability and very good viscometric properties at the same time.

The invention claimed is:

1. A method for the preparation of a polyalkyl (meth) acrylate polymer having a weight-average molecular weight in a range of 100,000 to 1,000,000 g/mol and comprising the following monomers:
   (a) 8 to 25% by weight of at least one ester of (meth) acrylic acid and hydroxylated hydrogenated polybutadiene;
   (b1) 60% to 80% by weight of at least one $C_{1-4}$ alkyl (meth)acrylate;
   (b2) 10% to 20% by weight of at least one $C_{10-30}$ alkyl (meth)acrylate; and
   (b3) 0% to 10% by weight of styrene;
   based on a total amount of the polyalkyl (meth)acrylate polymer,
   the method comprising:
   (i) preparing a monomer mixture 1 comprising 115 to 125% of a targeted content of monomer 1(a) and 95% to 100% of a targeted content of monomers (b1) to (b3), a concentration of the monomers (a) to (b3) in monomer mixture 1 being 30 to 40%;
   (ii) adding a monomer mixture 2 comprising 115 to 125% of the targeted content of monomer (a) and 95% to 100% of the targeted content of monomers (b1) to (b3), a concentration of the monomers (a) to (b3) in monomer mixture 2 being 30 to 40%; and
   (iii) adding a monomer mixture 3 comprising 110 to 120% of the targeted content of only monomers (b1) to (b3), the concentration of the monomers (b1 to (b3) in monomer mixture 3 being 2 to 6%,
   wherein monomer mixture 1 comprises 38 to 45% of a total amount of monomers used in the method, monomer mixture 2 comprises 38 to 45% of the total amount of monomers used in the method, and monomer mixture 3 comprises 15 to 20% of the total amount of monomers used in the method.

2. The method according to claim 1, wherein the polyalkyl (meth)acrylate polymer comprises:
   (a) 8 to 15% by weight of the at least one ester of (meth)acrylic acid and hydroxylated hydrogenated polybutadiene;
   (b1) 70% to 80% by weight of the at least one $C_{1-4}$ alkyl (meth)acrylate;

(b2) 10% to 20% by weight of the at least one $C_{10-30}$ alkyl (meth)acrylate; and (b3) 0% to 1% by weight of styrene, based on the total amount of the polyalkyl (meth)acrylate polymer.

3. The method according to claim 1, wherein the polyalkyl (meth)acrylate polymer comprises:

(a) 8 to 15% by weight of the at least one ester of (meth)acrylic acid and hydroxylated hydrogenated polybutadiene;

(b1) 70% to 80% by weight of at least one $C_{1-4}$ alkyl methacrylate;

(b2) 10% to 20% by weight of at least one $C_{10-15}$ alkyl methacrylate; and (b3) 0% to 1% by weight of styrene, based on the total amount of the polyalkyl (meth)acrylate polymer.

4. The method according to claim 1, wherein the weight-average molecular weight of the polyalkyl(meth)acrylate polymer is in a range of 400,000 to 800,000 g/mol.

5. The method according to claim 1, wherein the monomer mixtures 1 to 3 further comprise a base oil selected from the group consisting of API Group I oils, API Group II oils, API Group III oils, API Group IV oils, API Group V oils, and mixtures thereof.

6. The method according to claim 1, wherein the monomer mixtures 1 to 3 further comprise a base oil that comprises a mixture of API Group 111 and API Group V oils.

7. The method according to claim 1, wherein monomer mixture 1 comprises 65% to 75% by weight of API Group III oil or a mixture thereof and 25% to 35% by weight of Group V base oil or a mixture thereof, based on a total amount of base oil used in monomer mixture 1;

monomer mixture 2 comprises 65% to 75% by weight of API Group III oil or a mixture thereof and 25% to 35% by weight of Group V base oil or a mixture thereof, based on a total amount of base oil used in monomer mixture 2; and monomer mixture 3 comprises 100% by weight of API Group 111 oil or a mixture thereof, based on a total amount of base oil used in monomer mixture.

8. A polyalkyl (meth)acrylate polymer, prepared according to the method described in claim 1.

9. A method for improving kinematic viscosity and high-temperature high-shear (HTHS) performance of a lubricating oil composition, the method comprising:

adding a polyalkyl (meth)acrylate polymer prepared according to the method of claim 1 to the lubricating oil composition.

10. An additive composition, comprising:

(A1) 40 to 76% by weight of an API Group III oil or a mixture thereof;

(A2) 4% to 20% by weight of an API Group V oil or a mixture thereof; and (B) 20% to 40% by weight of a polyalkyl(meth)acrylate polymer prepared according to the method of claim 1, based on a total weight of the additive composition.

11. The method for the preparation of the polyalkyl (meth)acrylate polymer according to claim 1, wherein monomer mixture 1 comprises 8% to 17% by weight of monomer (a), 70% to 75% by weight of monomer (b1), 12% to 17% by weight of monomer (b2), and 0% to 1% by weight of monomer (b3), based on the total amount of monomer (a) to (b3) in monomer mixture 1, in a first base oil monomer mixture 2 comprises 8% to 17% by weight of monomers (a), 70% to 75% by weight of monomer (b1), 12% to 17% by weight of monomer (b2), and 0% to 1% by weight of monomer (b3), based on the total amount of monomers (a) to (b3) in monomer mixture 2, in a second base oil; and monomer mixture 3 comprises 81% to 86% by weight of monomers (b1) and 15 to 19% by weight of monomers (b2), based on a total amount of monomers (b1) and (b2) in monomer mixture 3, in a third base oil; and wherein monomer mixture 1 comprises 65% to 75% by weight of API Group III oil or a mixture thereof and 25% to 35% by weight of Group V base oil or a mixture thereof, based on a total amount of the first base oil used in monomer mixture;

monomer mixture 2 comprises 65% to 75% by weight of API Group III oil or a mixture thereof and 25% to 35% by weight of Group V base oil or a mixture thereof, based on a total amount of the second base oil used in monomer mixture 2; and monomer mixture 3 comprises 100% by weight of API Group Ill oil or a mixture thereof, based on a total amount of the third base oil used in monomer mixture 3.

12. The method according to claim 11, wherein the polyalkyl (meth)acrylate polymer comprises:

(a) 8 to 15% by weight of the at least one ester of (meth)acrylic acid and hydroxylated hydrogenated polybutadiene;

(b1) 70% to 80% by weight of the at least one $C_{1-4}$ alkyl (meth)acrylate;

(b2) 10% to 20% by weight of the at least one $C_{10-30}$ alkyl (meth)acrylates; and (b3) 0% to 1% by weight of styrene, based on the total amount of the polyalkyl (meth)acrylate polymer.

13. The method according to claim 11, wherein the polyalkyl (meth)acrylate polymer comprises:

(a) 8 to 15% by weight of the at least one ester of (meth)acrylic acid and hydroxylated hydrogenated polybutadiene;

(b1) 70%<) to 80% by weight of the at least one $C_{1-4}$ alkyl methacrylate;

(b2) 10% to 20% by weight of at least one $C_{10-15}$ alkyl methacrylates; and (b3) 0% to 1% by weight of styrene, based on the total amount of the polyalkyl (meth)acrylate polymer.

14. The method according to claim 1, wherein the at least one $C_{10-30}$ alkyl (meth)acrylate of monomer (b2) is at least one $C_{10-15}$ alkyl methacrylate.

15. The method according to claim 1, wherein the at least one $C_{10-30}$ alkyl (meth)acrylate of monomer (b2) is at least one $C_{12-14}$ alkyl methacrylate.

16. The method according to claim 9, wherein the lubricating oil composition is an engine oil composition.

17. The additive composition according to claim 10, comprising:

(A1) 56% to 67% by weight of the API Group III oil or the mixture thereof;

(A2) 8% to 14% by weight of the API Group V oil or the mixture thereof; and
(B) 25% to 30% by weight of the polyalkyl(meth)acrylate polymer,
based on the total weight of the additive composition.

* * * * *